(12) United States Patent
Ando (10) Patent No.: US 10,985,425 B2
(45) Date of Patent: Apr. 20, 2021

(54) FLOW BATTERY CONTAINING LITHIUM ION CONDUCTOR

(71) Applicant: Panasonic Intellectual Property Management Co., Ltd., Osaka (JP)

(72) Inventor: Shinji Ando, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 320 days.

(21) Appl. No.: 16/112,234

(22) Filed: Aug. 24, 2018

(65) Prior Publication Data

US 2019/0081302 A1 Mar. 14, 2019

(30) Foreign Application Priority Data

Sep. 11, 2017 (JP) .............................. JP2017-174321

(51) Int. Cl.
| | |
|---|---|
| *H01M 50/411* | (2021.01) |
| *H01M 50/449* | (2021.01) |
| *H01M 8/102* | (2016.01) |
| *H01M 8/1032* | (2016.01) |
| *H01M 8/1088* | (2016.01) |

(Continued)

(52) U.S. Cl.
CPC ......... *H01M 50/411* (2021.01); *C08J 5/2256* (2013.01); *H01M 8/1027* (2013.01); *H01M 8/1032* (2013.01); *H01M 8/1088* (2013.01); *H01M 8/188* (2013.01); *H01M 10/0565* (2013.01); *H01M 50/449* (2021.01); *C08J 2381/06* (2013.01); *H01M 2300/0082* (2013.01)

(58) Field of Classification Search
CPC .................................................. H01M 2/1653
See application file for complete search history.

(56) References Cited

U.S. PATENT DOCUMENTS

| | | | |
|---|---|---|---|
| 2013/0224538 A1* | 8/2013 | Jansen | H01M 8/188 429/72 |
| 2014/0178735 A1 | 6/2014 | Wang et al. | |

(Continued)

FOREIGN PATENT DOCUMENTS

| | | |
|---|---|---|
| JP | 2009-290116 | 12/2009 |
| JP | 2013-218868 | 10/2013 |

(Continued)

OTHER PUBLICATIONS

Search (Year: 2020).*

(Continued)

*Primary Examiner* — Brian R Ohara
(74) *Attorney, Agent, or Firm* — McDermott Will and Emery LLP (57) ABSTRACT

A flow battery includes: a first liquid containing a first nonaqueous solvent; a first electrode that is at least partly immersed in the first liquid; a second electrode which is a counter electrode to the first electrode; and a separator isolating the first electrode from the second electrode. The separator contains a lithium ion conductor. The lithium ion conductor contains a compound including main chains. At least one main chain of the main chains includes one or more aromatic rings and is cross-linked to at least another main chain of the main chains. At least one aromatic ring of the one or more aromatic rings includes one or more sulfo groups.

20 Claims, 3 Drawing Sheets

(51) Int. Cl.
    *H01M 8/18*     (2006.01)
    *H01M 10/0565*     (2010.01)
    *C08J 5/22*     (2006.01)
    *H01M 8/1027*     (2016.01)

(56) References Cited

U.S. PATENT DOCUMENTS

| | | |
|---|---|---|
| 2018/0048004 A1 | 2/2018 | Hojo |
| 2019/0189987 A1* | 6/2019 | Yang .................... H01M 2/145 |

FOREIGN PATENT DOCUMENTS

| | | |
|---|---|---|
| JP | 2014-524124 | 9/2014 |
| WO | 2015/119272 | 8/2015 |
| WO | 2016/208123 | 12/2016 |

OTHER PUBLICATIONS

Definitions16112234 (Year: 2020).*
The Extended European Search Report dated Nov. 6, 2018 for the related European Patent Application No. 18192081.0.
Geraldine Merle et al: "Friedel-Crafts Crosslinked Highly Sulfonated Polyether Ether Ketone (SPEEK) Membranes for a Vanadium/Air Redox Flow Battery", Membranes, vol. 4, No. 1, Dec. 30, 2013 (Dec. 30, 2013), pp. 1-19, XP55142612.
M.L. Di Vona et al: "High ionic exchange capacity polyphenylsulfone (SPPSU) and polyethersulfone (SPES) cross-linked by annealing treatment: Thermal stability, hydration level and mechanical properties", Journal of Membrane Science, vol. 354, No. 1-2, May 1, 2010 (May 1, 2010), pp. 134-141, XP055518590.

* cited by examiner

FLOW BATTERY CONTAINING LITHIUM ION CONDUCTOR

BACKGROUND

1. Technical Field

The present disclosure relates to a lithium ion conductor, a flow battery separator, and a flow battery.

2. Description of the Related Art

Japanese Unexamined Patent Application Publication (Translation of PCT Application) No, 2014-524124 has disclosed a redox flow battery system which includes an energy storage device containing a redox mediator.

WO2016/208123 has disclosed a flow battery using a redox species.

SUMMARY

One non-limiting and exemplary embodiment provides a flow battery including an electrolyte which is suppressed from being swelled by a nonaqueous solvent and which is able to conduct lithium ions.

In one general aspect, the techniques disclosed here feature a flow battery comprising: a first liquid containing a first nonaqueous solvent; a first electrode that is at least partly immersed in the first liquid; a second electrode which is a counter electrode to the first electrode; and a separator isolating the first electrode from the second electrode. The separator contains a lithium ion conductor. The lithium ion conductor contains a compound including main chains. At least one main chain of the main chains includes one or more aromatic rings and is cross-linked to at least another main chain of the main chains. At least one aromatic ring of the one or more aromatic rings includes one or more sulfo groups. In addition, a general or specific aspect of the present disclosure may be realized by a lithium ion conductor, a separator, a flow battery, a device, an apparatus, or any combination thereof.

According to a flow battery of one aspect of the present disclosure, the electrolyte is suppressed from being swelled by the nonaqueous solvent and is able to conduct lithium ions.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION (Underlying Knowledge Forming Basis of the Present Disclosure)

When a lithium ion conductive inorganic solid electrolyte was used as a membrane of a nonaqueous flow battery, since the inorganic solid electrolyte had no flexibility, cracks may be generated therein, and as a result, an increase in area of the membrane and a decrease in thickness thereof were difficult. In addition, when being used as a membrane of a nonaqueous flow battery, a flexible high molecular weight solid electrolyte is dissolved in or swelled by an electrolyte liquid of the nonaqueous flow battery, so that the membrane had a poor mechanical strength, and the charge/discharge characteristics were seriously degraded. Through intensive research carried out by the present inventor, a flow battery including an electrolyte which is not swelled by a nonaqueous solvent and which is able to conduct lithium ions and a separator to be used in the flow battery were finally obtained.

Hereinafter, embodiments of the present disclosure will be described with reference to the drawings.

First Embodiment

Figure 1:
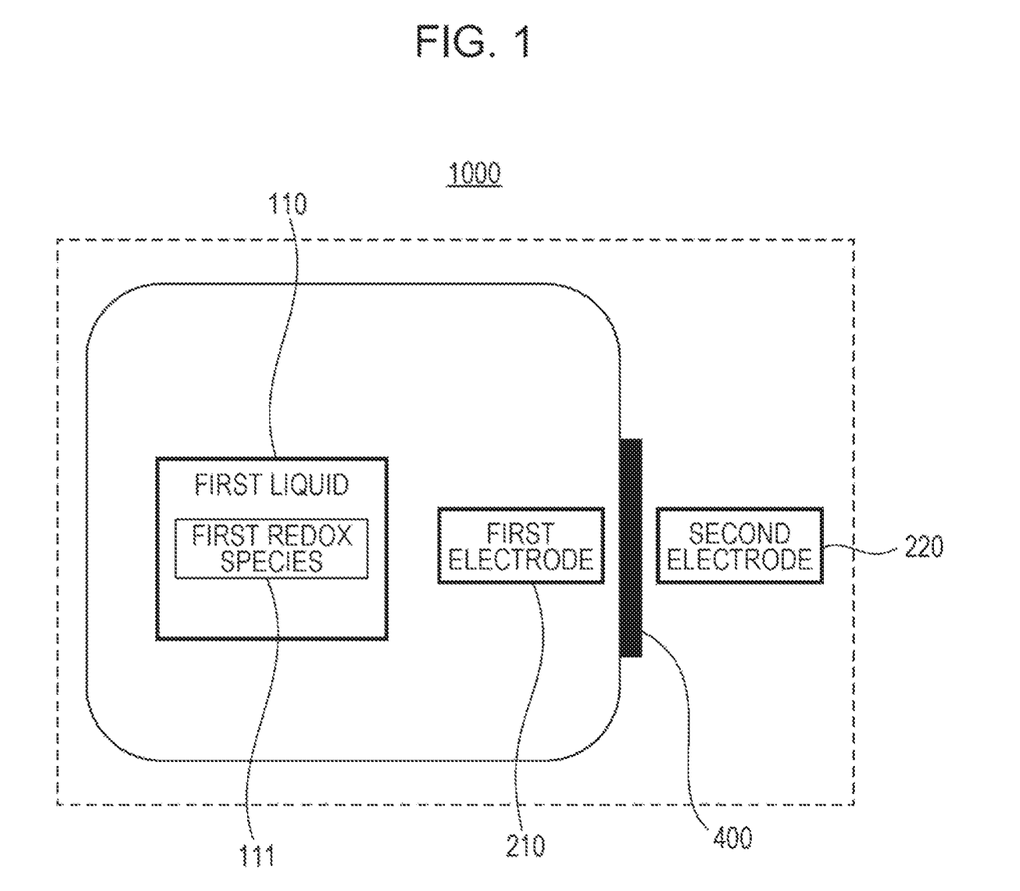
FIG. 1 is a block diagram showing a schematic structure of a flow battery according to a first embodiment.

FIG. 1 is a block diagram illustrating a schematic structure of a flow battery 1000 according to a first embodiment.

The flow battery 1000 according to the first embodiment includes a first liquid 110, a first electrode 210, a second electrode 220, and a separator 400.

The separator 400 contains a lithium ion conductor. The lithium ion conductor contains a compound having main chains. In this embodiment, this compound is a high molecular weight material. At least one main chain of the main chains has one or more aromatic rings. The at least one main chain is cross-linked to at least another main chain of the main chains. That is, the high molecular weight material partially has a cross-linking structure. At least one aromatic ring of the one or more aromatic rings is provided with one or more sulfo groups. At least one sulfo group of the high molecular weight material may be a —$SO_3Li$ group. The separator 400 is, for example, a membrane.

In addition, the at least one main chain may has one or more biphenyl skeletons. The one or more biphenyl skeletons are formed from aromatic rings included in the one or more aromatic rings. The aromatic rings forming the one or more biphenyl skeletons each may be independently provided with one or more sulfo groups.

In addition, the at east one main chain may have one or more sulfonyl groups (—$SO_2$—).

In addition, the at least one main chain may have one or more diphenyl ether skeletons. The one or more diphenyl ether skeletons are formed from aromatic rings included in the one or more aromatic rings. The aromatic rings forming the one or more diphenyl ether skeletons each may be independently provided with one or more sulfo groups.

In addition, the at least one main chain may have the one or more sulfonyl groups, the one or more biphenyl skeletons, and the one or more diphenyl ether skeletons. When the at least one main chain have the one or more biphenyl skeletons and the one or more diphenyl ether skeletons, a biphenyl skeleton and a diphenyl ether skeleton may collectively have the same one aromatic ring.

For example, a high molecular weight material of the present embodiment includes main chains. At least one main chain of the main chains has one or more aromatic rings. At least one aromatic ring of the one or more aromatic rings is provided with one or more sulfo groups. A cross-linking structure is partially formed. As such a high molecular weight material, for example, there may be mentioned a high molecular weight material having a structural unit represented by the following general formula (I) or a high molecular weight material having a structural unit represented by the following general formula (II).

In the formula, n is an integer equal to or greater than one, and n may be 2 or more.

In the formula, m and n are each independently an integer equal to or greater than one, and m and n each may be independently 2 or more.

The first liquid 110 is, for example, an electrolyte liquid containing a first nonaqueous solvent and a first redox species 111 dissolved in the first nonaqueous solvent.

The first electrode 210 is, for example, an electrode at least partly immersed in the first liquid 110.

According to the structure described above, a flow battery having a large charge capacity and maintaining charge/discharge characteristics for a long time can be realized.

That is, since having the structure as described above, the separator 400 is not swelled by the first liquid 110 (such as a first electrolyte liquid) in contact therewith and is able to conduct metal ions. Accordingly, the ranges of choice of the first electrolyte liquid and the first redox species 111 dissolved therein, each of which is usable, are increased. Hence, the control ranges of the charge potential and the discharge potential are increased, and the charge capacity can be increased.

In addition, according to the structure described above, since the separator 400 has flexibility, the increase in area and the reduction in thickness can be easily performed. Hence, a flow battery having a large capacity and a rapid charge/discharge rate can be realized.

The separator 400 functions, for example, as an electrolyte membrane capable of conducting lithium ions. The thickness of the electrolyte membrane is not particularly limited, and a thin film may also be used.

In the flow battery 1000 according to the first embodiment, the high molecular weight material contained in the separator 400 has a structural unit represented by the general formula [I] or a structural unit represented by the general formula [II]. In the general formulas [I] and [II], m and n each represent a repeating unit. The upper limits of m and n are not particularly limited. In the general formula [II], the rate of m to n is not particularly limited. For example, in the structural unit of the above general formula [II], the rate ((n/(m+n))×100) of n to the total repeating units may be 5% or more, may be 10% or more, may be 20% or more, may be 40% or more, or may also be 60% or more.

It is believed that in an ion conduction mechanism of the lithium ion conductor (that is, anion fixing type aromatic electrolyte) formed of the high molecular weight material having the structural unit represented by the general formula [I] or the structural unit represented by the general formula [II], the sulfo portion of the high molecular weight material functions as an exchange portion of a metal ion, and a solvated metal ion species transfers between the sulfo groups. In this type of electrolyte, when an ion exchange group capacity of the metal ion is increased, the electrical conductivity can be improved; however, since the electrolyte is swelled by and/or dissolved in a polar solvent, the mechanical strength is decreased.

In addition, in the flow battery 1000 according to the first embodiment, the high molecular weight material forming the separator 400 has one or more cross-linking points between at least two main chains. The cross-linking point is the structure obtained by a covalent bond formed between a sulfonyl group of a sulfa group of one main chain and an aromatic ring of the other main chain.

As a method for forming a cross-linking point, for example, there may be mentioned a method comprising: (1) preparing a coating liquid formed of an aprotic polar solvent and a high molecular weight material which has main chains having no cross-linking structures and in which each main chain has one or more aromatic rings provided with one or more sulfo groups; (2) applying the coating liquid on a glass substrate to form a coating film; and (3) heating the coating film. In addition, besides the glass substrate, as the substrate on which the coating liquid is applied, any substrate may be used as long as the coating liquid can be applied thereon. The high molecular weight material which has main chains having no cross-linking structures and in which each main chain has one or more aromatic rings provided with one or more sulfo groups may be obtained, for example, by a method in which (1) a solution is prepared by adding sulfonated dichlorodiphenyl sulfone represented by the following formula, 4,4'-dichlorodiphenyl sulfone, and 4,4'-biphnenol to an aprotic polar solvent;

(2) after the solution thus obtained is subjected to a polymerization reaction by heating and stirring, purification is performed, for example, using a filtration treatment and/or a treatment using a dialysis membrane, so that a polymer is obtained; (3) subsequently, the polymer thus obtained is subjected to a sulfonation treatment using sulfuric acid. As the aprotic polar solvent, for example, there may be mentioned dimethylsulfoxide, dimethylformamide, dimethylacetamide, acetonitrile, or N-methyl-2-pyrrolidone. The ratio of the raw material compounds (that is, the mixing ratio of sulfonated dichlorodiphenyl sulfone, 4,4'-dichlorodiphenyl sulfone, and 4,4'-biphnenol) is not particularly limited and may be 1:0.01 to 10:0.2 to 40, may be 1:0.1 to 5:0.5 to 20, may be 1:0.5 to 3:1.5 to 10, may be 1:1 to 2:2 to 5, or may also be 1:1:2.

An electrolyte membrane (hereinafter, also called "high molecular weight electrolyte membrane" in some cases) formed of the high molecular weight material having one or more cross-linking points can achieve a high mechanical strength and a high ion exchange group capacity. Hence, by an increase of ion exchange portions in association with the increase in ion exchange group capacity, the electrical conductivity can be improved.

In addition, in the flow battery 1000 according to the first embodiment, the separator 400 may be formed to contain a metal compound. As the metal compound forming the separator, an alkali metal compound and an alkaline earth metal compound, each of which generates a metal ion by dissociation thereof, may be used, and a lithium compound may also be used.

The high molecular weight electrolyte membrane may be manufactured, for example, in such a way that (1) a coating liquid formed of an aprotic polar solvent and a high molecular weight material which has main chains having no cross-linking structures and in which each main chain has one or more aromatic rings provided with one or more sulfo groups is prepared; (2) after the coating liquid is applied on a glass substrate to form a coating film, heating is performed thereon to form cross-linking points as described above; and (3) a high molecular weight membrane having a cross-linking structure thus obtained is impregnated in the metal compound forming the separator to perform an ion exchange treatment.

The ion exchange group capacity of the high molecular weight electrolyte membrane is not particularly limited and may be 2.5 meq/g or more, may be 3.5 meq/g or more, and may also be 4.5 meq/g or more. When the ion exchange group capacity of the high molecular weight electrolyte membrane is as described above, the above features can be sufficiently obtained.

The high molecular weight electrolyte membrane may also have as the ion exchange portion, a reactive functional group other than a sulfo group. As the reactive functional group other than a sulfo group, for example, there may be mentioned a fluorosulfo group, a phosphonate group, or a fluorophosphonate group. When the ion exchange portion is fluorinated, the dissociation of a metal ion is promoted, and the electrical conductivity can be improved. In addition, by the use of a phosphonate group, the number of exchange portions is increased, and the electrical conductivity can be improved.

In addition, when ethylene glycol, glycerol, or the like is added to the above reactive functional group so as to react therewith, a high molecular weight material having cross-linking points between the functional groups can be synthesized.

A method for manufacturing the separator may comprise: (1) impregnating a base material in the high molecular weight material having no cross-linking structures and the metal compound forming the separator; and (2) cross-linking the high molecular weight material. As the base material, for example, there may be mentioned a polypropylene non-woven cloth, a polyethylene non-woven cloth, a Teflon (registered trade name) sheet, a polyethylene separator, a polypropylene separator, a polyimide separator, a separator having a two-layer structure of PE/PP, a separator having a three-layer structure of PP/PE/PP, or an inorganic silica or glass.

In the flow battery 1000 according to the first embodiment, the first liquid 110 may use a nonaqueous solvent having at least one selected from the group consisting of a carbonate group and an ether oxygen.

As the nonaqueous solvent having a carbonate group, at least one selected from the group consisting of propylene carbonate (PC), ethylene carbonate (EC), dimethyl carbonate (DMC), ethyl methyl carbonate (EMC), and diethyl carbonate (DEC) may be used.

As the nonaqueous solvent having an ether oxygen, at least one selected from the group consisting of dimethoxy ethane, dibutoxy ethane, diglyme, triglyme, tetraglyme, tetrahydrofuran, 2-methyltetrahydrofuran, 2,5,-dimethyltetrahydrofuran, 1,3-dioxane, and 4-methyl-1,3-dioxane may be used.

In addition, in the flow battery 1000 according to the first embodiment, the first liquid 110 may be an electrolyte liquid which contains an electrolyte and which uses at least one of the materials mentioned above as the solvent of the first liquid 110. The electrolyte (such as a salt) may be at least one selected from the group consisting of $LiBF_4$, $LiPF_6$, LiTFSI, LiFSI, $LiCF_3SO_3$, and $LiClO_4$. In addition, the solvent may have a high dielectric constant, a low reactivity with Li ions, and a potential window of approximately up to 4 V.

In addition, in the flow battery 1000 according to the first embodiment, as the first redox species 111, a substance to be dissolved in the first electrolyte liquid and to be electrochemically oxidized and reduced may be used. For example, there may be used a metal ion, such as vanadium, iron, or chromium, and a metal complex, each of which may have a plurality of valent states; a heterocyclic compound, such as a tetrathiafulvalene derivative, bipyridine derivative, a thiophene derivative, a thianthrene derivative, a carbazole derivative, or a phenanthroline derivative; an oxocarbon, such as benzophenone or acetophenone; an aromatic compound, such as biphenyl, phenanthrene, stilbene, triphenylene, or terphenyl; or a metallocene compound, such as ferrocene. In addition, if needed, at least two of those compounds mentioned above may be used in combination.

In addition, in the flow battery 1000 according to the first embodiment, the first electrode 210 may be used as a positive electrode, and the second electrode 220 may be used as a negative electrode.

In addition, as the second electrode 220, when an electrode having a relatively high potential is used, the first electrode 210 may be used as the negative electrode.

That is, the first electrode 210 may be used as the negative electrode, and the second electrode 220 may be used as the positive electrode.

In addition, in the flow battery 1000 according to the first embodiment, for example, when the first liquid 110 is brought into contact with the first electrode 210, the first redox species 111 is oxidized or reduced by the first electrode 210.

The first electrode 210 may be an electrode having a surface which functions as a reaction field of the first redox species 111.

In this case, as the first electrode 210, a material stable to the first liquid 110 can be used. The material stable to the first liquid 110 may be, for example, a material insoluble in the first liquid 110. Furthermore, as the first electrode 210, a material stable to an electrochemical reaction, that is, an electrode reaction, may be used. For example, as the first electrode 210, a metal or carbon may be used. As the metal, for example, stainless steel, iron, copper, or nickel may be used.

The first electrode 210 may have a structure in which the surface area is increased. As a material which has a structure in which the surface area is increased, for example, a mesh, a non-woven cloth, a surface-roughening treatment plate, or a sintered porous body may be mentioned. By the material mentioned above, the specific surface area of the first electrode 210 is increased. Accordingly, the oxidation reaction or the reduction reaction of the first redox species 111 is more likely to proceed.

The second electrode 220 may have the structure including a collector and an active material provided on the collector. Accordingly, for example, an active material having a high capacity can be used. As the active material of the second electrode 220, a compound capable of reversibly occluding and releasing lithium ions may be used.

In addition, the second electrode 220 may be a lithium metal. As the second electrode 220, when a lithium metal is used, the dissolution and precipitation as the metal positive electrode is easily controlled, and in addition, a high capacity can be realized.

<Description of Charge/Discharge Process>

A charge/discharge process of the flow battery 1000 according to the first embodiment will be described.

In addition, in particular, the charge/discharge process will be described with reference to an operation example having the following structure.

In this operation example, the first electrode 210 is a positive electrode and is formed of carbon black.

In addition, in this operation example, the first liquid 110 is an ether solution in which the first redox species 111 is dissolved.

In addition, in this operation example, the first redox species 111 is benzophenone (hereinafter, referred to as "BP").

In addition, in this operation example, the second electrode 220 is a negative electrode and is formed of a lithium metal.

[Description of Charge Process]

First, the charge reaction will be described.

Between the first electrode 210 and the second electrode 220, the voltage is applied, so that the charge is performed.

(Reaction at Negative Electrode Side)

By the voltage application, electrons are supplied from the outside of the flow battery to the second electrode 220 functioning as the negative electrode. Accordingly, at the second electrode 220 functioning as the negative electrode, a reduction reaction occurs. That is, the negative electrode is placed in a charged state.

For example, in this operation example, the following reaction occurs.

$$Li^+ + e^- \rightarrow Li$$

(Reaction at Positive Electrode Side)

By the voltage application, at the first electrode 210 functioning as the positive electrode, an oxidation reaction of the first redox species 111 occurs. That is, at the surface of the first electrode 210, the first redox species 111 is oxidized. Accordingly, electrons are discharged from the first electrode 210 to the outside of the flow battery.

For example, in this operation example, the following reaction occurs.

$$BP.Li \rightarrow BP + Li^+ + e^-$$

Those charge reactions described above proceed until the first redox species 111 is placed in a fully charged state or the second electrode 220 is placed in a fully charged state.

[Description of Discharge Process]

Next, a discharge reaction from the fully charged state will be described.

In the fully charged state, the first redox species 111 and the second electrode 220 are each placed in a fully charged state.

In the discharge reaction, an electrical power is extracted between the first electrode 210 and the second electrode 220.

(Reaction at Negative Electrode Side)

At the second electrode 220 functioning as the negative electrode, the oxidation reaction occurs. That is, the negative electrode is placed in a discharged state. Accordingly, electrons are discharged from the second electrode 220 to the outside of the flow battery.

For example, in this operation example, the following reaction occurs.

$$Li \rightarrow Li^+ + e^-$$

(Reaction at Positive Electrode Side)

By the discharge of the battery, electrons are supplied to the first electrode 210 functioning as the positive electrode from the outside of the flow battery. Accordingly, on the first electrode 210, the reduction reaction of the first redox species 111 occurs. That is, on the surface of the first electrode 210, the first redox species 111 is reduced.

For example, in this operation example, the following reaction occurs.

In addition, some lithium ions (Li$^+$) are supplied from a second electrode 220 side through the separator 400.

Those discharge reactions described above will proceed until the first redox species 111 is placed in a fully discharged state or the second electrode 220 is placed in a fully discharged state.

Second Embodiment

Hereinafter, a second embodiment will be described. In addition, a description duplicated with that of the above first embodiment will be appropriately omitted.

As the second embodiment, the structure in which the electrolyte liquid is circulated at each of a first electrode side and a second electrode side is shown.

Figure 2:
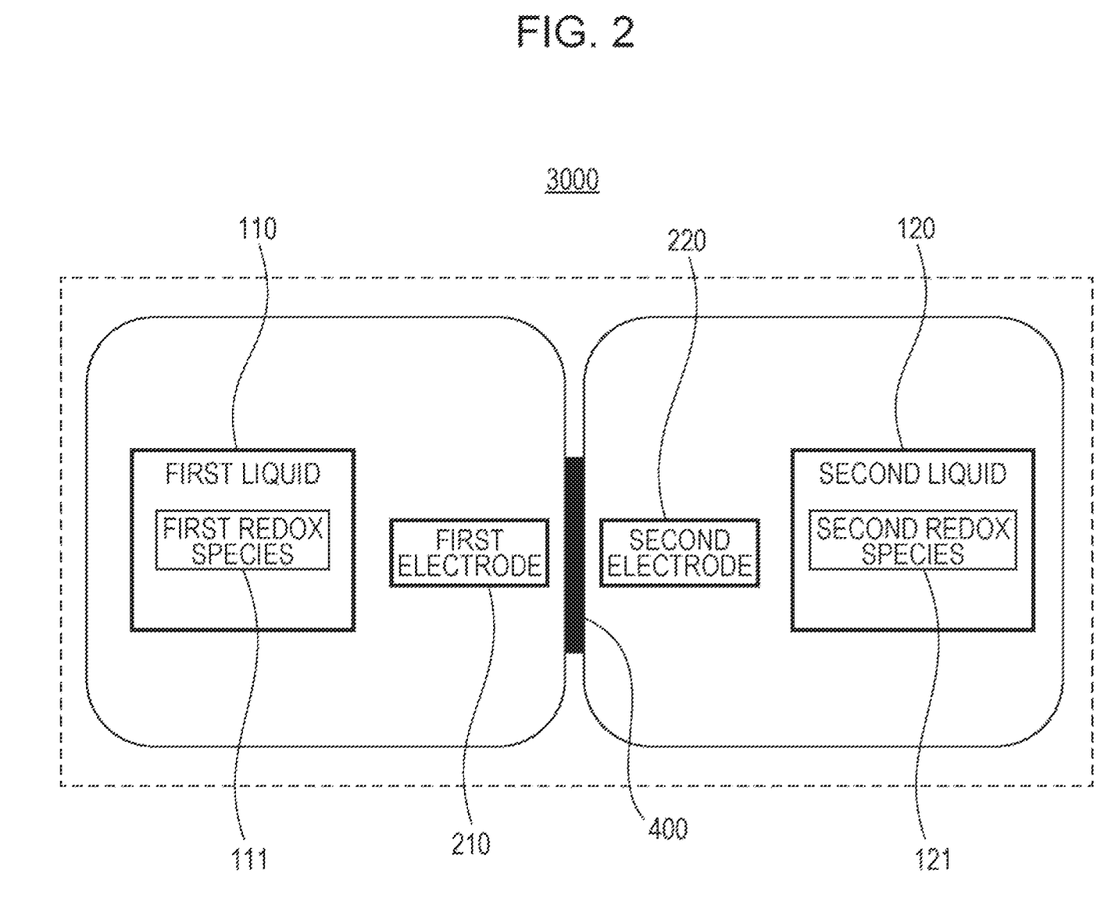
FIG. 2 is a block diagram showing a schematic structure of a flow battery according to a second embodiment.

FIG. 2 is a block diagram illustrating a schematic structure of a flow battery 3000 according to the second embodiment.

The flow battery 3000 according to the second embodiment further includes the following structure besides the structure of he flow battery 1000 according to the first embodiment described above.

That is, the flow battery 3000 according to the second embodiment further includes a second liquid 120 containing a second nonaqueous solvent, a second electrode 220, and a second redox species 121.

The second liquid 120 is a liquid in which the second redox species 121 is dissolved in the second nonaqueous solvent.

The second electrode 220 is an electrode at least partly immersed in the second liquid 120.

The separator 400 isolates the first electrode 210 and the first liquid 110 from the second electrode 220 and the second liquid 120.

According to the structure described above, a flow battery having a large charge capacity and maintaining charge/discharge characteristics for a long time can be realized.

That is, since the separator 400 has the structure as described above, the separator 400 is able to conduct metal ions without being swelled by the first liquid (such as the first electrolyte liquid) 110 and the second liquid (such as the second electrolyte liquid) 120 each of which is in contact with the separator 400. Accordingly, the ranges of choice of the first electrolyte liquid, the first redox species 111 to be dissolved therein, the second electrolyte liquid, and the second redox species 121, each of which is usable, are increased, the control ranges of the charge potential and the discharge potential are increased, and the charge capacity can be increased. Furthermore, even if the composition of the first electrolyte liquid is different from that of the second electrolyte liquid, since those two compositions are held by the separator 400 so as not to be mixed with each other, the charge/discharge characteristics of the flow battery can be maintained for a long time.

In the flow battery 3000 according to the second embodiment, as is the case of the first liquid 110, the second liquid 120 can use a nonaqueous solvent having at least one selected from the group consisting of a carbonate group and an ether oxygen. In the second liquid 120, the same nonaqueous solvent as that of the first liquid 110 may be used, or a nonaqueous solvent different therefrom may also be used.

In the flow battery 3000 according to the second embodiment, as the second redox species 121, a substance which is dissolved in the second electrolyte liquid and which can be electrochemically oxidized and reduced may be used. In particular, a metal-containing ion or an organic compound similar to the first redox species 111 may be used. When a compound having a low potential is used for one of the first redox species 111 and the second redox species 121, and a compound having a high potential is used for the other, the flow battery works.

Third Embodiment

Hereinafter, a third embodiment will be described. In addition, a description duplicated with that of the first or the second embodiment will be appropriately omitted.

Figure 3:
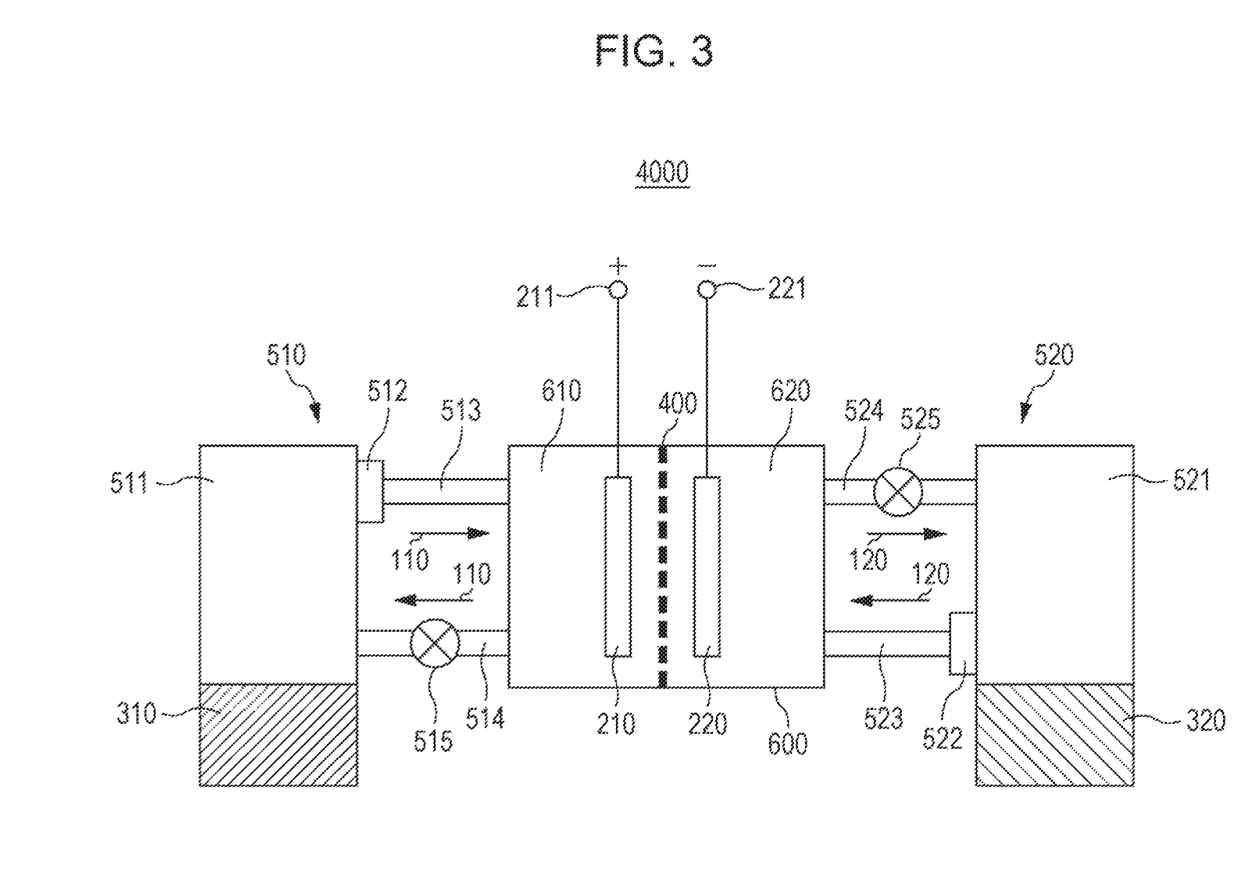
FIG. 3 is a schematic view sowing a schematic structure of a flow battery according to a third embodiment.

FIG. 3 is a block diagram illustrating a schematic structure of a flow battery 4000 according to the third embodiment.

The flow battery according to the third embodiment further includes the following structure besides the structure of the flow battery according to the second embodiment described above.

That is, the flow battery according to the third embodiment includes a first circulator 510.

The first circulator 510 is a mechanism circulating the first liquid 110 between the first electrode 210 and a first active material 310.

The first circulator 510 includes a first receiving portion 511.

The first active material 310 and the first liquid 110 are received in the first receiving portion 511.

The first circulator 510 circulates the first liquid 110 between the first electrode 210 and the first receiving portion 511.

Since the first active material 310 and the first liquid 110 are brought into contact with each other in the first receiving portion 511, an oxidation reaction and/or a reduction reaction of the first redox species 111, that is, a first electrode mediator, is performed by the first active material 310.

According to the structure described above, in the first receiving portion 511, the first liquid 110 and the first active material 310 can be brought into contact with each other. Accordingly, for example, a contact area between the first liquid 110 and the first active material 310 can be more increased. In addition, a contact time between the first liquid 110 and the first active material 310 can also be more increased. Hence, the oxidation reaction and the reduction reaction of the first redox species 111 by the first active material 310 can be more efficiently performed.

In addition, in the third embodiment, the first receiving portion 511 may be, for example, a tank.

In addition, the first receiving portion 511 may receive the first liquid 110 in which the first electrode mediator 111 is dissolved, for example, in spaces formed between particles of the first active material 310 thus filled.

In addition, as shown in FIG. 3, the flow battery according to the third embodiment may further include an electrochemical reaction portion 600, a positive electrode terminal 211, and a negative electrode terminal 221.

The electrochemical reaction portion 600 is divided into a positive electrode chamber 610 and a negative electrode chamber 620 by the separator 400.

In the positive electrode chamber 610, an electrode functioning as the positive electrode is disposed. In FIG. 3, in the positive electrode chamber 610, the first electrode 210 is disposed.

The positive electrode terminal 211 is connected to the electrode functioning as the positive electrode, and in this case, the positive electrode terminal 211 is connected to the first electrode 210.

In the negative electrode chamber 620, an electrode functioning as the negative electrode is disposed. In FIG. 3, in the negative electrode chamber 620, the second electrode 220 is disposed.

The negative electrode terminal 221 is connected to the electrode functioning as the negative electrode, and in this case, the negative electrode terminal 221 is connected to the second electrode 220.

The positive electrode terminal 211 and the negative electrode terminal 221 are connected, for example, to a charge/discharge device. By the charge/discharge device, the voltage is applied between the positive electrode terminal 211 and the negative electrode terminal 221, or the electric power is extracted between the positive electrode terminal 211 and the negative electrode terminal 221.

In addition, as shown in FIG. 3, in the flow battery according to the third embodiment, the first circulator 510 may include a pipe 513, a pipe 514, and a pump 515.

One end of the pipe 514 is connected to one of the positive electrode chamber 610 and the negative electrode chamber 620 in which the first electrode 210 is disposed. In FIG. 3, the one end of the pipe 514 is connected to the positive electrode chamber 610.

The other end of the pipe 514 is connected to the first receiving portion 511 at an inlet side of the first liquid 110.

One end of the pipe 513 is connected to the first receiving portion 511 at an outlet side of the first liquid 110.

The other end of the pipe 513 is connected to one of the positive electrode chamber 610 and the negative electrode chamber 620 in which the first electrode 210 is disposed. In FIG. 3, the other end of the pipe 513 is connected to the positive electrode chamber 610.

The pump 515 is provided, for example, at the pipe 514. Alternatively, the pump 515 may be provided at the pipe 513.

In the flow battery according to the third embodiment, the first circulator 510 may include a first permeation suppression portion 512.

The first permeation suppression portion 512 suppress the permeation of the first active material 310.

The first permeation suppression portion 512 is provided at a flow path through which the first liquid 110 flows from the first receiving portion 511 to the first electrode 210. In FIG. 3, the first permeation suppression portion 512 is provided at the pipe 513.

According to the structure described above, the first active material 310 is suppressed from flowing to a side (for example, to a first electrode 210 side) other than the first receiving portion 511. That is, the first active material 310 stays in the first receiving portion 511. Accordingly, a flow battery in which the first active material 310 itself is not circulated can be realized. Hence, clogging of insides of members, such as the pipes, of the first circulator 510 caused by the first active material 310 can be prevented. In addition, the generation of resistance loss caused by the flow of the first active material 310 to the first electrode 210 side can also be prevented.

The first permeation suppression portion 512 may be provided, for example, at a joint portion between the first receiving portion 511 and the pipe 513.

The first permeation suppression portion 512 may be, for example, a filter filtrating the first active material 310. In this case, the filter may be a member having pores smaller than the minimum particle diameter of the particles of the first active material 310. As a material of the filter, a material which is not allowed to react with the first active material 310, the first liquid 110, and the like may be used. As the filter, for example, there may be mentioned glass fiber filter paper, a polypropylene non-woven cloth, a polyethylene non-woven cloth, a polyethylene separator, a polypropylene separator, a polyimide separator, a separator having a two-layer structure of PE/PP, a separator having a three-layer structure of PP/PE/PP, or a metal mesh which is not allowed to react with metal lithium.

According to the structure described above, in the first receiving portion 511, even if the flow of the first active material 310 is generated in association with the flow of the first liquid 110, the first active material 310 is prevented from flowing out of the first receiving portion 511.

In FIG. 3, the first liquid 110 received in the first receiving portion 511 is supplied to the positive electrode chamber 610 through the first permeation suppression portion 512 and the pipe 513.

Accordingly, the first electrode mediator 111 dissolved in the first liquid 110 is oxidized or reduced by the first electrode 210.

Subsequently, the first liquid 110 in which the oxidized or the reduced first electrode mediator 111 is dissolved is supplied to the first receiving portion 511 through the pipe 514 and the pump 515.

Accordingly, the oxidation reaction and/or the reduction reaction is performed on the first electrode mediator 111 dissolved in the first liquid 110 by the first active material 310.

In addition, the control of the circulation of the first liquid 110 may be performed, for example, by the pump 515. That is, by the pump 515, the start of the supply of the first liquid 110, the stop of the supply thereof, the supply amount of the first liquid 110, or the like may be appropriately adjusted.

In addition, the control of the circulation of the first liquid 110 may be performed by a method other than that using the pump 515. The other method may be, for example, a method using a valve or the like.

In addition, in FIG. 3, as one example, the first electrode 210 is used as the positive electrode, and the second electrode 220 is used as the negative electrode.

In this case, as the second electrode 220, when an electrode having a relatively higher potential is used, the first electrode 210 may be used as the negative electrode.

That is, the first electrode 210 may be used as the negative electrode, and the second electrode 220 may be used as the positive electrode.

In addition, at a positive electrode chamber 610 side and at a negative electrode chamber 620 side separated by the separator 400, the compositions of the electrolyte liquids and/or the compositions of the solvents may be different from each other.

In addition, the composition of the electrolyte liquid and/or the composition of the solvent at the positive electrode chamber 610 side may be the same as those at the negative electrode chamber 620 side.

The flow battery according to the third embodiment may further include a second circulator 520.

The second circulator is a mechanism circulating the second liquid 120 between the second electrode 220 and a second active material 320.

The second circulator 520 includes a second receiving portion 521.

The second active material 320 and the second liquid 120 are received in the second receiving portion 521.

The second circulator 520 circulates the second liquid 120 between the second electrode 220 and the second receiving portion 521.

Since the second active material 320 and the second liquid 120 are brought into contact with each other in the second receiving portion 521, an oxidation reaction and/or a reduction reaction of the second redox species 121, that is, a second electrode mediator, is performed by the second active material 320.

According to the structure described above, in the second receiving portion 521, the second liquid 120 and the second active material 320 can be brought into contact with each other. As a result, for example, a contact area between the second liquid 120 and the second active material 320 can be more increased. In addition, a contact time between the second liquid 120 and the second active material 320 can be more increased. Hence, the oxidation reaction and/or the reduction reaction of the second redox species 121 by the second active material 320 can be more efficiently performed.

In addition, in the third embodiment, the second receiving portion 521 may be, for example, a tank.

In addition, the second receiving portion 521 may receive the second liquid 120 in which the second redox species 121 is dissolved, for example, in spaces formed between particles of the second active material 320 thus filled.

In addition, as shown in FIG. 3, in the flow battery 4000 according to the third embodiment, the second circulator 520 may include a pipe 523, a pipe 524, and a pump 525.

One end of the pipe 524 is connected to one of the positive electrode chamber 610 and the negative electrode chamber 620 in which the second electrode 220 is disposed. In FIG. 3, the one end of the pipe 524 is connected to the negative electrode chamber 620.

The other end of the pipe 524 is connected to the second receiving portion 521 at an inlet side of the second liquid 120.

One end of the pipe 523 is connected to the second receiving portion 521 at an outlet side of the second liquid 120.

The other end of the pipe 523 is connected to one of the positive electrode chamber 610 and the negative electrode chamber 620 in which the second electrode 220 is disposed. In FIG. 3, the other end of the pipe 523 is connected to the negative electrode chamber 620.

The pump 525 is provided, for example, at the pipe 524. Alternatively, the pump 525 may be provided at the pipe 523.

In addition, in the flow battery 4000 according to the embodiment 3, the second circulator 520 may also include a second permeation suppression portion 522.

The second permeation suppression portion 522 suppresses the permeation of the second active material 320.

The second permeation suppression portion 522 is provided at a flow path through which the second liquid 120 flows from the second receiving portion 521 to the second electrode 220. In FIG. 3, the second permeation suppression portion 522 is provided at the pipe 523.

According to the structure described above, the second active material 320 is suppressed from flowing to a side (for example, to a second electrode 220 side) other than the second receiving portion 521. That is, the second active material 320 stays in the second receiving portion 521. Accordingly, a flow battery in which the second active material 320 itself is not circulated can be realized. Hence, clogging of insides of members, such as the pipes, of the second circulator 520 caused by the second active material 320 can be prevented. In addition, the generation of resistance loss caused by the flow of the second active material 320 to the second electrode 220 side can also be prevented.

The second permeation suppression portion 522 may be provided, for example, at a joint portion between the second receiving portion 521 and the pipe 523.

The second permeation suppression portion 522 may be, for example, a filter filtrating the second active material 320. In this case, the filter may be a member having pores smaller than the minimum particle diameter of the particles of the second active material 320. As a material of the filter, a material which is not allowed to react with the second active material 320, the second liquid 120, and the like may be used. As the filter, for example, there may be mentioned glass fiber filter paper, a polypropylene non-woven cloth, a polyethylene non-woven cloth, or a metal mesh which is not allowed to react with metal lithium.

According to the structure described above, in the second receiving portion 521, even if the flow of the second active material 320 is generated in association with the flow of the second liquid 120, the second active material 320 is prevented from flowing out of the second receiving portion 521.

In the example shown in FIG. 3, the second liquid 120 received in the second receiving portion 521 is supplied to the negative electrode chamber 620 through the second permeation suppression portion 522 and the pipe 523.

Accordingly, the second redox species 121 dissolved in the second liquid 120 is oxidized or reduced by the second electrode 220.

Subsequently, the second liquid 120 in which the oxidized or the reduced second redox species 121 is dissolved is supplied to the second receiving portion 521 through the pipe 524 and the pump 525.

Accordingly, the oxidation reaction and/or the reduction reaction is performed on the second redox species 121 dissolved in the second liquid 120 by the second active material 320.

In addition, the control of the circulation of the second liquid 120 may be performed, for example, by the pump 525. That is, by the pump 525, the start of the supply of the second liquid 120, the stop of the supply thereof, the supply amount of the second liquid 120, or the like may be appropriately adjusted.

In addition, the control of the circulation of the second liquid 120 may be performed by a method other than that using the pump 525. The other method may be, for example, a method using a valve or the like.

In addition, in FIG. 3, as one example, the first electrode 210 is used as the positive electrode, and the second electrode 220 is used as the negative electrode.

In this case, as the first electrode 210 side, when an electrode structure having a relatively low potential is used, the second electrode 220 side may be used as the positive electrode.

That is, the second electrode 220 may be used as the positive electrode, and the first electrode 210 may be used as the negative electrode.

In addition, the structures according to the above embodiments 1 to 3 may be appropriately used in combination.

In addition, as another embodiment according to the present disclosure, there may be mentioned a flow battery separator in which a lithium ion conductor is contained, the lithium ion conductor contains a high molecular weight material which has main chains having aromatic rings provided with sulfo groups, and the high molecular weight material partially has a cross-linking structure. The separator is similar to the separator of each of the above first to third embodiments.

EXAMPLES

Next, although the present disclosure will be described in more detail with reference to examples, the present disclosure is not limited thereto and may be variously modified and/or changed by a person skilled in the art without departing from the technical scope of the present disclosure.

Sulfonated dichlorodiphenyl sulfone used in the following synthesis example has the following structure.

Synthesis Example of SPES25

A NMP solution (90 mL) containing sulfonated dichlorodiphenyl sulfone (5.10 g, 10.4 mmol), 4,4'-biphenol (3.87 g, 20.8 mmol), 4,4'-dichlorodiphenyl sulfone (2.97 g, 10.4 mmol), and potassium carbonate (5.21 g, 37.7 mmol) was prepared. The NMP solution was charged into a three-necked flask equipped with a reflux condenser, a Dean-Stark trap, and a mechanical stirrer and was then heated at 135° C. for 3 hours with stirring in a nitrogen atmosphere. After toluene (30 mL) was added to this reaction solution, and an azeotropic treatment was performed at 150° C. with stirring, heating was performed with stirring at 185° C. for 12 hours, Subsequently, after the reaction solution was spontaneously cooled to room temperature, potassium carbonate was removed by a filtration treatment, so that a filtrate was obtained. Next, the filtrate thus obtained was purified using a dialysis membrane. The solution was distilled off, so that an aromatic high molecular weight material (SPES25) was obtained.

Synthesis Example of SPES75

After a sulfuric acid solution (50 mL) containing the aromatic high molecular weight material SPES25 (1.5 g) was heated and stirred in a flask at 70° C. for 5 days, the solution was spontaneously cooled to room temperature and was then charged into an ice bath. This reaction solution was purified using a dialysis membrane, and the solution was distilled off, so that a high molecular weight material (SPES75) which had main chains having no cross-linking structures and in which each main chain had one or more aromatic rings provided with one or more sulfo groups was obtained.

Synthesis Example of SPES50

A NMP solution (45 mL) containing sulfonated dichlorodiphenyl sulfone (5.10 g, 10.4 mmol), 4,4'-biphenol (1.94 g, 10.4 mmol), and potassium carbonate (2.61 g, 18.9 mmol) was prepared. The NMP solution was charged into a three-necked flask equipped with a reflux condenser, a Dean-Stark trap, and a mechanical stirrer and was then heated at 135° C. for 3 hours with stirring in a nitrogen atmosphere. After toluene (15 mL) was added to this reaction solution, and an azeotropic treatment was performed at 150° C. with stirring, heating was performed with stirring at 185° C. for 12 hours. After the reaction solution was spontaneously cooled to room temperature, potassium carbonate was removed by a filtration treatment, so that a filtrate was obtained. Next, the filtrate thus obtained was purified using a dialysis membrane, and the solution was distilled off, so that an aromatic high molecular weight material (SPES50) was obtained.

Synthesis Example of SPES100

After a sulfuric acid solution (50 mL) containing the aromatic high molecular weight material SPES50 (1.5 g) was heated and stirred in a flask at 70° C. for 5 days, the solution was spontaneously cooled to room temperature and was then charged into an ice bath. This reaction solution was purified using a dialysis membrane, and the solution was distilled off, so that a high molecular weight material (SPES100) which had main chains having no cross-linking structures and in which each main chain had one or more aromatic rings provided with one or more sulfo groups was obtained.

Example 1-1

The high molecular weight material (SPES100) which had main chains having no cross-linking structures and in which each main chain had one or more aromatic rings provided with one or more sulfo groups was added to dimethylsulfoxide (DMSO) and was then heated with stirring at 50° C., so that a uniform coating liquid containing the high molecular weight material (SPES100) at a concentration of 5 percent by weight was prepared. This coating liquid was cast on a glass substrate, was then dried, and subsequently was peeled away from the glass substrate, so that a transparent high molecular weight membrane (SPES100) was formed. This high molecular weight membrane was pressed with a Teflon sheet (registered trade name) and then heated at 200° C. for 12 hours. Subsequently, this high molecular weight membrane was impregnated in an aqueous solution of lithium hydroxide at a concentration of 1 M for an ion exchange treatment and was then washed with water, so that a transparent pale yellow high molecular weight membrane (CL-SPES100) having a cross-linking structure was formed. The skeleton of the high molecular weight membrane (CL-SPES100) synthesized in this example is shown by the following general formula [I]. In addition, the ion exchange group capacity of the high molecular weight membrane (SPES100) before heating was 5.6 meq/g, and the ion exchange group capacity of the high molecular weight membrane (CL-SPES100) after heating was 4.7 meq/g.

In the formula, n is an integer equal to or greater than one.

Example 1-2

Except for that the high molecular weight material which had main chains having aromatic rings provided with sulfa groups was changed to SPES75, a high molecular weight membrane (CL-SPES75) was formed in a manner similar to that of Example 1-1. The skeleton of the high molecular weight membrane (CL-SPES75) synthesized in this example is shown by the following general formula [II] In addition, the ion exchange group capacity of the high molecular weight membrane (SPES75) before heating was 4.7 meq/g, and the ion exchange group capacity of the high molecular weight membrane (CL-SPES75) after heating was 3.8 meq/g.

In the formula, m and n are each independently an integer equal to or greater than one.

The electrical conductivity at 25° C. of the high molecular weight membrane of each of Example 1-1 and Example 1-2 was measured. The electrical conductivity of the high molecular weight membrane of Example 1-1 was $1\times10^{-4}$ S/cm, and the electrical conductivity of the high molecular weight membrane of Example 1-2 was $1\times10^{-5}$ S/cm. Hence, as the ion exchange group capacity was increased, the electrical conductivity was increased.

In addition, when the high molecular weight membrane of each of the above examples was brought into contact with propylene carbonate, the shape of the membrane was maintained without being dissolved or swelled.

Comparative Example 1

When the high molecular weight membrane (SPES100) before cross-linking, which was formed in Example 1-1, was brought into contact with propylene carbonate, the high molecular weight membrane was fully dissolved.

Comparative Example 2

When the high molecular weight membrane (SPES75) before cross-linking, which was formed in Example 1-2, was brought into contact with propylene carbonate, the high molecular weight membrane was fully dissolved.

The flow battery of the present disclosure may be used, for example, as an electric power storage device or an electric power storage system.

What is claimed is:

1. A flow battery comprising:

a first liquid containing a first nonaqueous solvent;

a first electrode that is at least partly immersed in the first liquid;

a second electrode which is a counter electrode to the first electrode; and a separator isolating the first electrode from the second electrode, wherein the separator contains a lithium ion conductor, the lithium ion conductor contains a compound including main chains, and the compound includes a structural unit represented by the following general formula [I], where n is an integer equal to or greater than one.

2. A flow battery comprising:
a first liquid containing a first nonaqueous solvent
a first electrode that is at least partly immersed in the first liquid;
a second electrode which is a counter electrode to the first electrode; and
a separator isolating the first electrode from the second electrode,
wherein the separator contains a lithium ion conductor,
the lithium ion conductor contains a compound including main chains, and
the compound includes a structural unit represented by the following general formula [II], where m and n are each independently an integer equal to or greater than one.

3. The flow battery according to claim 1, wherein the first nonaqueous solvent contains one or more types of solvents, and the one or more types of solvents each independently have at least one selected from the group consisting of a carbonate group and an ether oxygen.

4. The flow battery according to claim 3, wherein the one or more types of solvents include at least one selected from the group consisting of propylene carbonate, ethylene carbonate, dimethyl carbonate, ethyl methyl carbonate, and diethyl carbonate.

5. The flow battery according to claim 3, wherein the one or more solvents include at least one selected from the group consisting of dimethoxyethane, dibutoxyethane, diglyme, triglyme, tetraglyme, tetrahydrofuran, 2-methyltetrahydrofurna, 2,5-dimethyltetrahydrofuran, 1,3-dioxane, and 4-methyl-1,3-dioxane.

6. The flow battery according to claim 1, further comprising:
a first active material; and
a first circulator circulating the first liquid between the first electrode and the first active material, wherein the first liquid contains a first redox species dissolved in the first nonaqueous solvent,
the first active material is insoluble in the first liquid,
the first redox species is oxidized and reduced at the first electrode, and
the first redox species is oxidized and reduced by the first active material.

7. The flow battery according to claim 1, further comprising:
a second liquid containing a second nonaqueous solvent,
wherein the second electrode is at least partly immersed in the second liquid.

8. The flow battery according to claim 7,
wherein the second nonaqueous solvent has a composition different from that of the first nonaqueous solvent.

9. The flow battery according to claim 7, further comprising:
a second active material; and
a second circulator circulating the second liquid between the second electrode and the second active material,
wherein the second liquid contains a second redox species dissolved in the second nonaqueous solvent,
the second active material is insoluble in the second liquid,
the second redox species is oxidized and reduced at the second electrode, and
the second redox species is oxidized and reduced by the second active material.

10. A lithium ion conductor comprising:
a compound including a structural unit represented by the following general formula [I], where n is an integer equal to or greater than one.

11. A lithium ion conductor comprising:
a compound including a structural unit represented by the following general formula [II], where m and n are each independently an integer equal to or greater than one.

12. A flow battery separator comprising:
the lithium ion conductor according to claim 10.

13. The flow battery separator according to claim 12, further comprising a base material.

14. The flow battery according to claim 2, wherein the first nonaqueous solvent contains one or more types of solvents, and the one or more types of solvents each independently have at least one selected from the group consisting of a carbonate group and an ether oxygen.

15. The flow battery according to claim 14, wherein the one or more types of solvents include at least one selected from the group consisting of propylene carbonate, ethylene carbonate, dimethyl carbonate, ethyl methyl carbonate, and diethyl carbonate.

16. The flow battery according to claim 14, wherein the one or more solvents include at least one selected from the group consisting of dimethoxyethane, dibutoxyethane, diglyme, triglyme, tetraglyme, tetrahydrofuran, 2-methyltetrahydrofurna, 2,5-dimethyltetrahydrofuran, 1,3-dioxane, and 4-methyl-1,3-dioxane.

17. The flow battery according to claim 2, further comprising:
a first active material; and
a first circulator circulating the first liquid between the first electrode and the first active material,
wherein the first liquid contains a first redox species dissolved in the first nonaqueous solvent,
the first active material is insoluble in the first liquid,
the first redox species is oxidized and reduced at the first electrode, and
the first redox species is oxidized and reduced by the first active material.

18. The flow battery according to claim 2, further comprising:
a second liquid containing a second nonaqueous solvent,
wherein the second electrode is at least partly immersed in the second liquid.

19. The flow battery according to claim 18,
wherein the second nonaqueous solvent has a composition different from that of the first nonaqueous solvent.

20. The flow battery according to claim 18, further comprising:
a second active material; and
a second circulator circulating the second liquid between the second electrode and the second active material,
wherein the second liquid contains a second redox species dissolved in the second nonaqueous solvent,
the second active material is insoluble in the second liquid,
the second redox species is oxidized and reduced at the second electrode, and
the second redox species is oxidized and reduced by the second active material.

* * * * *